UNITED STATES PATENT OFFICE.

THOMAS H. MOONEY, OF DAYTON, OHIO.

COMPOSITION OF MATTER FOR TREATING ARTIFICIAL STONE.

SPECIFICATION forming part of Letters Patent No. 424,805, dated April 1, 1890.

Application filed December 12, 1889. Serial No. 333,487. (No specimens.)

*To all whom it may concern:*

Be it known that I, THOMAS H. MOONEY, of Dayton, in the county of Montgomery and State of Ohio, have invented certain Improvements in Composition of Matter, of which the following is a specification.

My invention relates to a composition of matter for treating articles made of artificial s'one to render them water-proof and to impart to the surface a smooth hard finish. It is intended more particularly, but not necessarily, to be used in treating articles formed of artificial stone and cast in a mold of peculiar construction forming the basis of an application for Letters Patent of the United States filed by me on the 12th day of December, 1889.

My composition consists of the following ingredients, combined in the proportions stated: lamp-black, four ounces; alcohol, one pint; gelatine, four ounces; water, thirty-four quarts; chromic acid, one-half ounce; lime, (air-slaked,) eight ounces; Portland cement, three hundred and forty-five ounces.

The composition is compounded in the following manner: The lamp-black is mixed with the alcohol, the gelatine dissolved in two quarts of boiling water, and the chromic acid mixed with the air-slaked lime. After the lamp-black has been thoroughly mixed with the alcohol the mixture is poured into a vessel containing eight gallons of water. The dissolved gelatine being then added, the mixture is stirred thoroughly. Finally the chromic acid and the air-slaked lime are placed in the solution, and it is again thoroughly stirred or agitated.

The cement is combined with the above mixture, when it is applied to articles, in the proportion of three parts of the mixture to one part of cement.

In treating articles with my composition the casting while still soft is coated with it by means of a brush. It is then smoothed down by means of a trowel. When treated in this manner, the surface of the casting is given a hard smooth finish and is rendered water-proof.

What I claim, and desire to secure by Letters Patent, is—

The herein-described composition of matter, consisting of lamp-black, alcohol, gelatine, water, chromic acid, lime, and Portland cement, in proportions substantially such as specified.

In testimony whereof I hereunto set my hand, this 23d day of November, 1889, in the presence of two attesting witnesses.

THOMAS H. MOONEY.

Witnesses:
   M. J. SWADENER,
   E. T. HALL.